(12) United States Patent
Wheeler et al.

(10) Patent No.: US 9,058,054 B2
(45) Date of Patent: Jun. 16, 2015

(54) IMAGE CAPTURE APPARATUS

(75) Inventors: Aaron J. Wheeler, San Francisco, CA (US); Hayes S. Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 577 days.

(21) Appl. No.: 13/408,698

(22) Filed: Feb. 29, 2012

(65) Prior Publication Data

US 2013/0222638 A1    Aug. 29, 2013

(51) Int. Cl.
H04N 7/18    (2006.01)
H04N 5/76    (2006.01)
G09G 5/00    (2006.01)
G06F 3/01    (2006.01)
H04N 21/4223    (2011.01)
H04N 21/442    (2011.01)
H04N 21/4788    (2011.01)
G06F 1/16    (2006.01)
G06F 3/0482    (2013.01)
H04N 5/77    (2006.01)
H04N 5/225    (2006.01)

(52) U.S. Cl.
CPC ............ *G06F 3/013* (2013.01); *H04N 21/4223* (2013.01); *H04N 21/44218* (2013.01); *H04N 21/4788* (2013.01); *H04N 5/2251* (2013.01); *G06F 1/163* (2013.01); *G06F 3/0482* (2013.01); *H04N 5/772* (2013.01)

(58) Field of Classification Search
CPC ... H04N 5/772; H04N 2101/00; H04N 5/907; H04N 1/2112; H04N 9/8047; G06T 19/00; G06F 3/011; G06F 3/012; G02B 27/017
USPC ........................................ 348/231.2; 345/633
See application file for complete search history.

(56) References Cited

U.S. PATENT DOCUMENTS 5,245,381 A    9/1993    Takagi et al.
2003/0025798 A1    2/2003    Grosvenor et al.
(Continued)

FOREIGN PATENT DOCUMENTS

KR    10-2005-0089371 A    9/2005

OTHER PUBLICATIONS

Machine translation of Foreign Patent Document KR10-2005-0089371 A listed above.
(Continued)

*Primary Examiner* — Dave Czekaj
*Assistant Examiner* — Tsion B Owens
(74) *Attorney, Agent, or Firm* — McDonnell Boehnen Hulbert & Berghoff LLP

(57) ABSTRACT

Methods and systems for capturing an image are provided. In one example, a head-mounted device (HMD) having an image capturing device, a viewfinder, a gaze acquisition system, and a controller may be configured to capture an image. The image capturing device may be configured to have an imaging field of view including at least a portion of a field of view provided by the viewfinder. The gaze acquisition system may be configured to acquire a gaze direction of a wearer. The controller may be configured to determine whether the acquired gaze direction is through the viewfinder and generate an image capture instruction based on a determination that the acquired gaze direction indicates a gaze through the viewfinder. The controller may further be configured to cause the image capturing device to capture an image.

20 Claims, 11 Drawing Sheets

(56) References Cited

U.S. PATENT DOCUMENTS

| | | | |
|---|---|---|---|
| 2004/0103111 A1* | 5/2004 | Miller et al. | 707/102 |
| 2007/0201847 A1 | 8/2007 | Lei | |
| 2008/0180537 A1 | 7/2008 | Weinberg et al. | |
| 2009/0189974 A1 | 7/2009 | Deering | |
| 2010/0053555 A1 | 3/2010 | Enriquez et al. | |
| 2010/0220291 A1 | 9/2010 | Horning et al. | |
| 2012/0194549 A1* | 8/2012 | Osterhout et al. | 345/633 |
| 2013/0258089 A1* | 10/2013 | Lyons et al. | 348/77 |

OTHER PUBLICATIONS

International Search Report for corresponding International Application No. PCT/US2013/026067.

Written Opinion for corresponding International Application No. PCT/US2013/026067.

J. Vockeroth et al., The Combination of a Mobile Gaze-Driven and a Head-Mounted Camera in a Hybrid Perspective Setup, Systems, Man and Cybernetics, 2007. ISIC. IEEE International Conference on, Oct. 7-10, 2007, pp. 2576-2581.

T. Selker et al., Eye-R, a Glasses-Mounted Eye Motion Detection Interface, CHI 2001 Extended Abstracts, Mar. 31-Apr. 5, 2001, pp. 179-180, ACM, (2001).

EyeSeeCam [online], Retrieved Feb. 29, 2012. Retrieved from the Internet:<URL: http://eyeseecam.com/>.

* cited by examiner

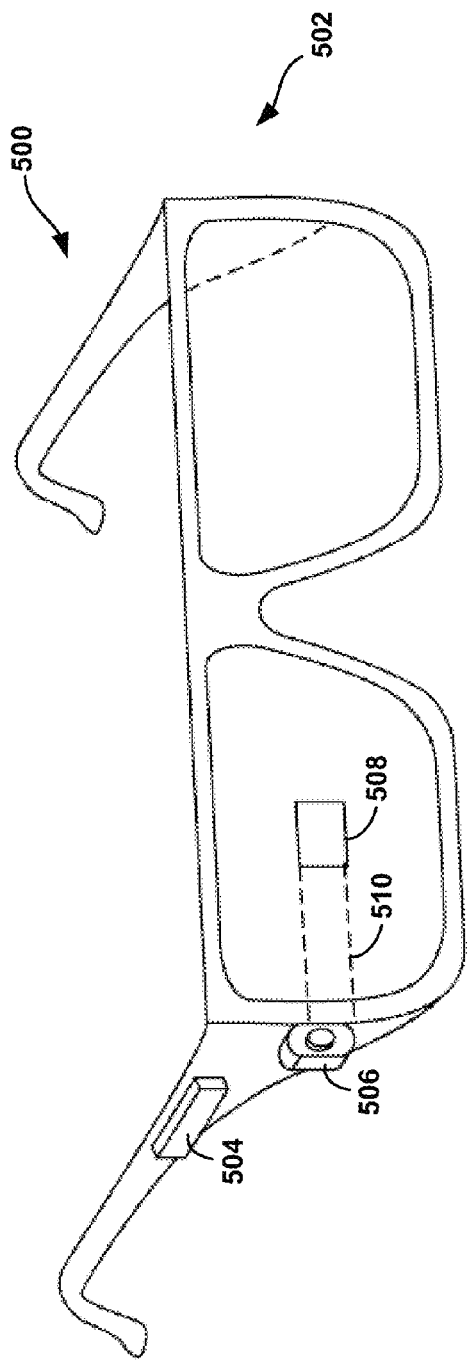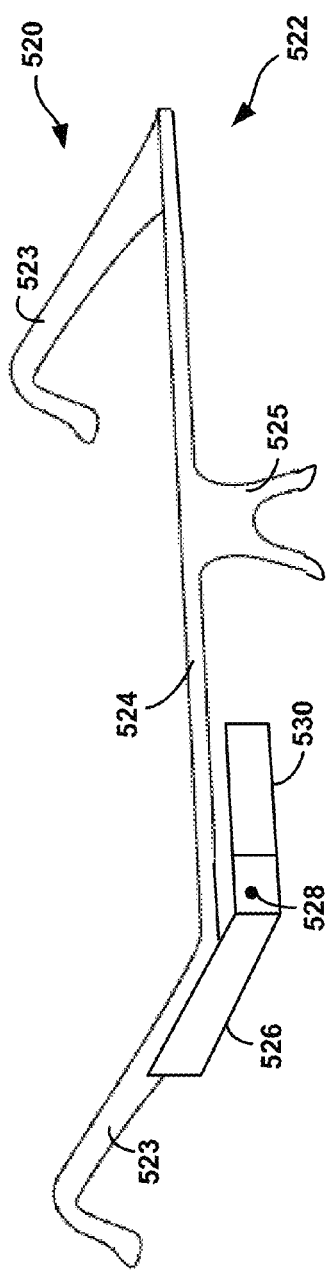
FIGURE 5A
FIGURE 5B

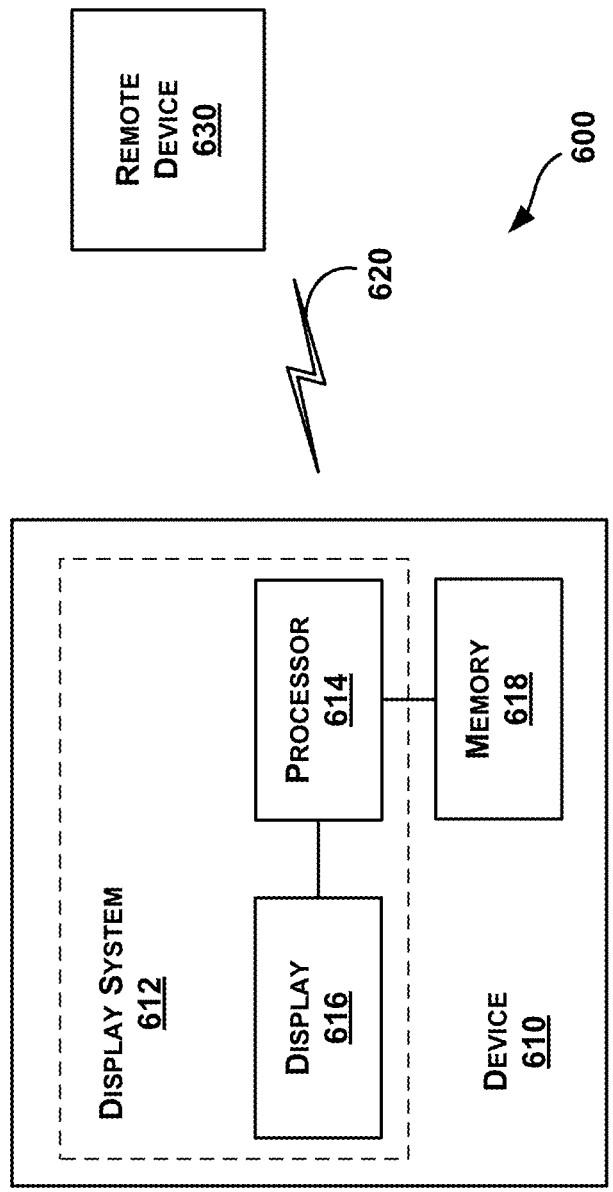

IMAGE CAPTURE APPARATUS

BACKGROUND

Unless otherwise indicated herein, the materials described in this section are not prior art to the claims in this application and are not admitted to be prior art by inclusion in this section.

Wearable systems can integrate various elements, such as miniaturized computers, cameras, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems as well as miniaturized electronic components and optical elements, it has become possible to consider wearable compact cameras for capturing the wearer's experiences of the real world.

By orienting the wearable camera towards the same general direction as the wearer's point of view, media representing a real world experience of the user can be captured. The captured media may include video, audio, and still frame images. In some cases, the media may be captured continuously. In other cases, the media may be captured based on inputs from the wearer.

SUMMARY

In a first aspect, an apparatus is provided. The apparatus includes a viewfinder providing a field of view. The apparatus further includes an image capturing device. The apparatus also includes a controller configured to determine whether the acquired gaze direction indicates a gaze through the viewfinder. The controller is further configured to generate an image capture instruction based, at least in part, on a determination that the acquired gaze direction indicates a gaze through the viewfinder. The controller is also configured to cause the image capturing device to capture an image in accordance with the image capture instruction. The captured image includes at least a portion of the field of view provided by the view finder.

In a second aspect, a method is provided. The method includes obtaining a gaze direction in an apparatus. The method further includes determining that the gaze direction indicates a gaze through a viewfinder. The viewfinder provides a field of view. The method further includes generating an image capture instruction based, at least in part, on the indicated gaze through the viewfinder. The method further includes causing an image capturing device to capture an image in accordance with the image capture instruction. The captured image includes at least a portion of the field of view provided by the view finder.

In a third aspect, a non-transitory computer readable memory with instructions stored thereon is provided. The instructions may be executable by a computing device to cause the computing device to perform functions. The functions include obtaining a gaze direction in a apparatus. The functions further include determining that the gaze direction indicates a gaze through a viewfinder. The viewfinder provides a field of view. The functions further include generating an image capture instruction based, at least in part, on the indicated gaze through the viewfinder. The function further includes causing an image capturing device to capture an image in accordance with the image capture instructions. The captured image includes at least a portion of the field of view provided by the view finder.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5A illustrates another example system for receiving, transmitting, and displaying data.

FIG. 5B illustrates yet another example system for receiving, transmitting, and displaying data.

FIG. 6 shows a simplified block diagram of an example computer network infrastructure.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

In an example scenario, a user wearing an apparatus or system, such as a head-mountable device (HMD) may be engaged in a real-world experience. For example, the wearer may be commuting on a train, hiking in the woods, or enjoying a meal with friends and family, while wearing the HMD.

In one case, the HMD may include a camera configured to capture images representing the experiences of the user, from a point of view of the user.

At some point, the wearer may wish to capture a "moment" of an experience with the camera on the HMD. For example, the user may be having a wonderful time having a holiday meal with family and friends. After the meal, the family and friends may be lingering around the table talking and laughing, and the user may wish to capture the wonderful moment. In this instance, the user may perform an action to trigger the HMD camera to capture an image representing the wonderful moment from the point of view of the wearer, without disrupting the moment by leaving the table to find a handheld camera.

This use of the HMD may also be applied to other scenarios for capturing moments experienced by the user, whether the moments are expected, unexpected, memorable, or in passing. Further discussions relating to devices and methods for capturing images representing experiences from the perspective of a user may be found below in more detail.

2. Example HMD System for Capturing Images

Figure 1A:
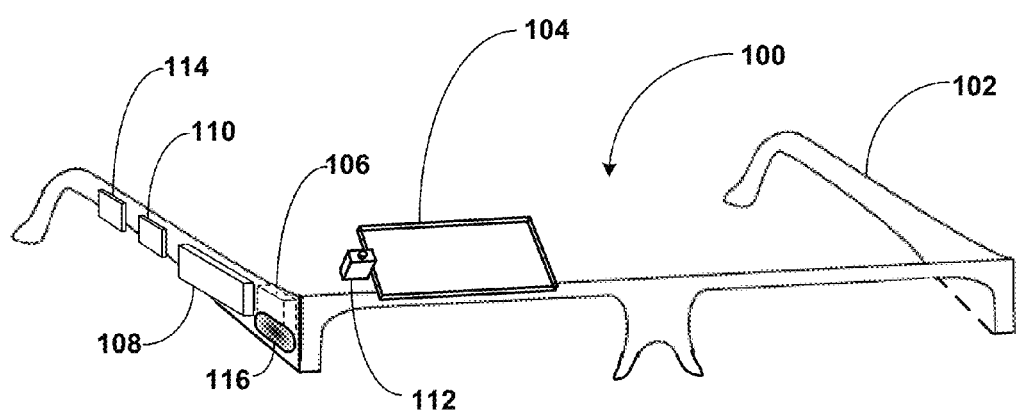
FIG. 1A illustrates a first view of an example head-mountable device (HMD) configured to capture images based on gaze detection.

FIG. 1A illustrates a first view of an example HMD 100 configured to capture images based on gaze detection. In one embodiment, the HMD 100 may be worn by a user, and the capturing of images may be based on detection of gaze of the user. In one example, the HMD 100 may include a HMD frame 102, a finger-operable touch pad 116, a viewfinder 104, an image capturing device 112, a gaze acquisition system 106, a controller 108, a motion detection system 110, and a data storage medium 114. As shown, the frame 102 may be similar to frames of eye glasses having a bridge that may rest on a wearer's nose, temples that may rest over the wearer's ears, and a bar connecting the temples and the bridge. In some cases, the bar may above a line of sight of the wearer, as shown. In other cases, the bar may be below the natural line of sight of the wearer. In this case, the natural line of sight of the wearer refers to the line of sight of the wearer of the HMD when the wearer is casually looking forward.

In one example, the finger-operable touch pad 116, the viewfinder 104, the image capturing device 112, the gaze acquisition system 106, the controller 108, the motion detection system 110, and the data storage medium 114 may each be attached to the frame 102. As shown in FIG. 1A, the gaze acquisition system 106, the finger-operable touch pad 116, the controller 108, the motion detection system 110, and the data storage medium 114 may be attached to the temples of the frame 102, while the viewfinder 104 and the image capturing device 112 may be attached to the bar of the frame 102. In this example, the finger-operable touch pad 116, the gaze acquisition system 106 and controller 108 are shown to be attached along the side of one of the temples. However, one skilled in the art will appreciate that other arrangements for coupling the finger-operable touch pad 116, the gaze acquisition system 106, controller 108, the motion detection system 110, and the data storage medium 114 to the HMD frame 102 can be implemented. Similarly, the image capturing device 112 in this example is shown to be attached to the viewfinder 104 attached along the top of the bar of the frame 102, but one skilled in the art will appreciate that other arrangements for coupling the viewfinder 104 and the image capturing device 112 to the HMD frame 102 can be implemented.

In another embodiment, the HMD 100 may further include a display, similar to a display 508 of FIG. 5A. In one case, the display may be a transparent display and positioned in the line of sight of the wearer. In this case, the viewfinder 104 may be positioned at a peripheral position relative to the display, such as a position above the display. Further detail pertaining to the display 508 can be found below in connection to FIG. 5A.

Figure 1B:
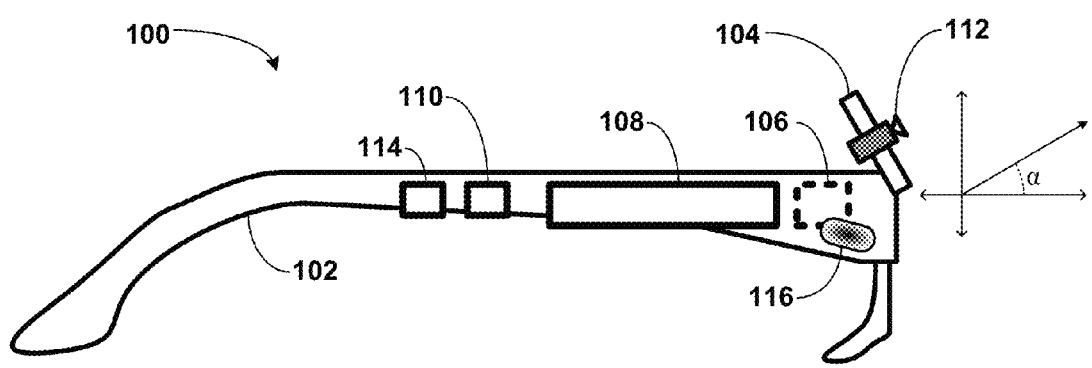
FIG. 1B illustrates a second view of the example HMD configured to capture images based on gaze detection.

FIG. 1B illustrates a second view of the example HMD 100 configured to capture images based on gaze detection. In FIG. 1B, the second view of the HMD 100 is a side view of the example HMD 100 of FIG. 1A, showing the HMD frame 102, the finger-operable touch pad 116, the viewfinder 104, the image capturing device 112, the gaze acquisition system 106, the controller 108, the motion detection system 110, and the data storage medium 114.

As shown in FIG. 1B, the viewfinder 104 of HMD 100 may be positioned at an angle $\alpha$ above the line of sight of the wearer. In one example, the viewfinder 104 may be of a transparent material through which the wearer may see. As such, the viewfinder 104 may provide a field of view. In this case, the viewfinder 104 may further include a visual indication of a center of the provided field of view. For example, a reticle may be provided on the viewfinder indicating the center of the provided field of view.

The image capturing device 112 of HMD 100 may be a camera capable of capturing digital still images and/or video, and may be configured to capture images that include at least a portion of the field of view provided by the viewfinder. In other words, the image capturing device 112 may be configured to have an imaging field of view that includes at least a portion of the field of view provided by the viewfinder 104. As shown in FIG. 1B, the image capturing device 112 may be configured to have an imaging field of view that includes at least a portion of the field of view provided by the viewfinder by positioning the image capturing device 112 also at the angle $\alpha$, or an angle close to the angle $\alpha$ from the line of sight of the wearer.

The imaging field of view of the image capturing device 112 may further be configured to be wider or narrower than the field of view of the viewfinder. In one example, the image capturing device 112 may be a camera having wide angle lens, such that the imaging field of view may be wider than the field of view of the viewfinder 104. In another example, the imaging field of view of the image capturing device 112 may be adjustable using a zoom function, such that a focusing element of the camera may be adjusted to zoom in on an object of interest. As a result of zooming in on the object of interest, the imaging field of view may become narrower than the field of view provided by the viewfinder 104.

The gaze acquisition system 106 of HMD 100 may be configured to acquire a gaze direction of the wearer. In one example, the gaze acquisition system 106 may be configured to acquire the gaze direction based on eye-tracking data provided by an eye-tracking device coupled to the gaze acquisition system 106. In one case, the eye-tracking device may include one or more inward facing cameras for tracking the movements of at least one eye of the wearer. The tracking of eye movements may be based on pupil or glint tracking, for example. The tracked movements of the at least one eye may then be used to determine gaze directions indicating directions where the wearer may be looking.

Figure 4A:
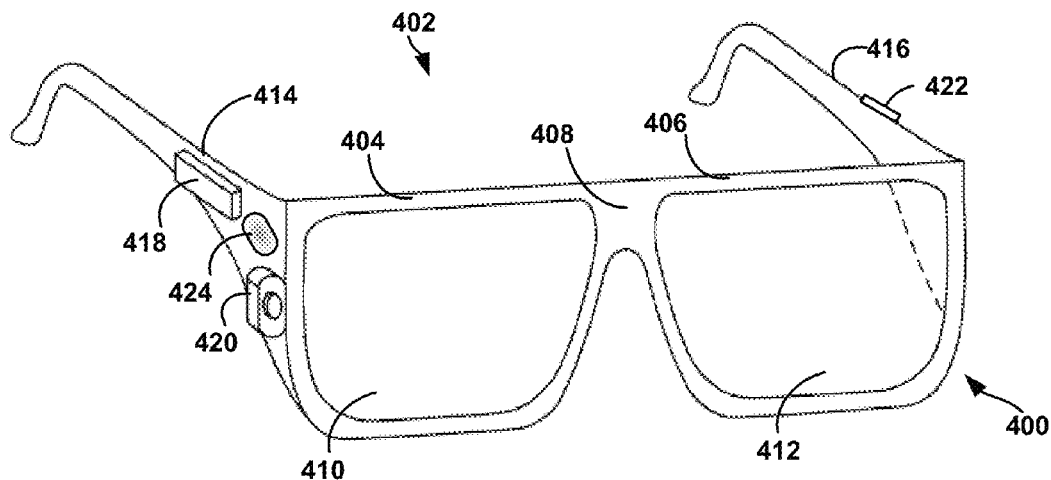
FIG. 4A illustrates an example system for receiving, transmitting, and displaying data.

The controller 108 of HMD 100 may be an on-board computing system similar to on-board computing systems 418 and 504 of FIGS. 4A and 5A, respectively. Details pertaining to the on-board computing systems 418 and 504 may be found below in connection to FIGS. 4A and 5A, respectively. Discussions of exemplary structural components of the controller 108 may also be found in further detail below in connection to FIGS. 6 and 7 below.

In one example, the controller 108 may be configured to determine whether the gaze direction acquired by the gaze acquisition system 106 indicates a gaze through the viewfinder 104. In one case, determining whether the acquired gaze direction indicates a gaze through the viewfinder 104 may be based on relative positions between the viewfinder 104 and the at least one eye of the wearer. For instance, in the case the viewfinder 104 is positioned at an angle α above the line of sight of the wearer, determining whether the acquired gaze direction indicates a gaze through the view finder 104 may be based on a relative angle between the acquired gaze direction and the natural line of sight of the wearer. In this instance, if the relative angle of the acquired gaze direction is α or approximately α, the acquired gaze direction may indicate a gaze through the viewfinder 104.

In another instance, the controller 108 may be configured to determine that the acquired gaze direction indicates a gaze through the viewfinder 104 if the relative angle of the acquired gaze direction is within a range of relative angles. In this instance, the range of relative angles may be determined based on the dimensions of the viewfinder 104 and the distance of the viewfinder 104 from the at least one eye of the wearer.

In addition to determining whether the acquired gaze direction indicates a gaze through the viewfinder 104, the controller may also be configured to determine a gaze point associated with the gaze through the viewfinder. The gaze point may indicate a point of interest within the field of view. For instance, the wearer may be looking at an object of interest within the field of view provided by the viewfinder 104. Even though the wearer is looking at the object of interest, the object of interest may not necessarily be at or near the center of the field of view provided by the viewfinder 104. As such, the gaze point may be determined, such that the gaze point represents a location within the field of view through which the wearer is looking when looking at the object of interest.

The controller 108 may further be configured to generate an image capture instruction. The generated image capture instructions may be used to instruct the image capturing device 112 to capture images. In one case, the image capture instruction may be generated based, at least in part, on the determination that the acquired gaze direction indicates a gaze through the viewfinder 104. For example, the image capture instruction may indicate when an image should be captured. In one instance, the image capture instruction may indicate that the image capturing device 112 should capture an image when a gaze through the viewfinder 104 is present. As mentioned above, the image captured by the image capturing device 112 will include the field of view provided by the viewfinder In another case, the image capture instruction may be generated based also on a duration of the gaze through the viewfinder 104. In this case, the image capture instruction may indicate that the image capturing device 112 should capture an image when a gaze through the viewfinder 104 has been present for at least a first predetermined duration. As such, the image capture instruction will instruct the image capturing device 112 to capture an image when the wearer is more likely to be looking through the viewfinder 104 intentionally, rather than when the user might be unintentionally gazing through the viewfinder 104.

In a further case, the image capture instructions may be generated based on a duration of a gaze through a gaze point in the field of view of the viewfinder 104. In this case, the image capture instructions may indicate that the image capturing device 112 should capture an image when gaze through a specific location in the field of view of the viewfinder 104 has been present for the first predetermined duration. In other words, the image capture instruction will not instruct the image capturing device 112 to capture an image while the wearer may be looking through different locations of the viewfinder 104 to locate an object of interest the wearer wishes to capture an image of, before gazing at the object of interest in the viewfinder 104. Rather, the image capture instruction will instruct the image capturing device 112 to capture an image after the wearer has been gazing at the object of interest through the specific location in the field of view of the viewfinder 104 for the first predetermined duration.

In addition to generating an image capture instruction for capturing images, the controller 108 may further be configured to generate an image capture instruction further indicating whether the image capturing device 112 should capture video. In one example, the wearer of the HMD may indicate whether video should be captured, either in addition to capturing images, or instead of capturing images. The controller 108 may then generate an image capture instruction accordingly.

If video should be captured, the controller 108 may generate an image capture instruction indicating that the image capturing device 112 should capture video when a gaze through the viewfinder 104 has been present for at least a second predetermined duration. The second predetermined duration may be the same or longer than the first predetermined duration for triggering the capture of an image such that video may be captured beginning when the image is captured, or after the image is captured. For example, the first predetermined duration may be two seconds, and the second predetermined duration may be three seconds. As such, if a gaze through the viewfinder 104 has been present for two seconds, an image may be captured, and if the gaze through the viewfinder 104 continues for another second, for a total of three seconds, a video may be captured.

The image capture instruction may further indicate when the image capturing device 112 should stop capturing video. In one instance, the image capture instruction may indicate a third predetermined duration, such as five seconds, for which video should be captured. In another instance, the image capture instructions may indicate that the image capturing device 122 should continue to capture video until the gaze through the viewfinder 104 is no longer present. In a further case, the image capture instruction may indicate that the image capturing device 112 should automatically begin capturing video after capturing an image.

In addition to detections of gaze or durations of detected gaze, the image capture instructions may further be generated based on other eye gestures, such as eye-blinking. For example, the image capturing instructions may indicate that the image capturing device 112 should capture an image when an eye-blink is detected by the gaze acquisition system 106 after a gaze through the viewfinder 104 is present.

In addition to generating image capture instructions indicating when the image capturing device 112 should capture an image, the controller 108 may also be configured to generate the image capture instruction indicating how the image capturing device 112 should be focused when capturing the image, based on the gaze point. As mentioned above, the image capturing device 112 may be configured to have an imaging field of view which includes at least a portion of the field of view provided by the viewfinder 104. Thus, locations within the field of view provided by the viewfinder 104 may be mapped to locations within the imaging field of view of the image capturing device 112. As such, the gaze point indicating a point of interest within the field of view of the viewfinder 104 may be mapped to a corresponding location within the imaging field of view of the image capturing device 112. Accordingly, the controller 108 may generate image capture instruction indicating the corresponding location within the imaging field of view that the image capturing device 112 should focus on, thereby focusing on the object of interest the wearer is looking at when capturing the image.

In addition to determining whether the acquired gaze direction indicates a gaze through the viewfinder 104, and generating image capture instruction, the controller 108 may further be configured to cause the image capturing device 112 to capture an image in accordance with the image capture instruction. As mentioned above, the image capture instruction may indicate when an image should be captured and further, where the image capturing device 112 should be focused. In one example, the controller 108 may cause the image capturing device 112 to capture an image or adjust a focusing element according to the image capture instructions. In another example, the controller 108 may provide the image capture instructions to the image capturing device 112 and a computing device of the image capturing device 112 may process the image capture instructions to capture an image or adjust the focus accordingly.

The motion detection system 110 of HMD 100 may be configured to acquire movement data associated with the HMD, and determine movements of the HMD based on the movement data. In one example, the motion detection system 110 may include a motion sensor such as an accelerometer and/or gyroscope for detecting at least linear, radial, and axial movements and generating movement data based on the detected movements. In one case, the motion detection system 110 may also include a computing device for determining movements of the HMD based on the movement data. In another case, the motion detection system 110 may provide the movement data to the controller 108 and the controller 108 may determine movements of the HMD based on the movement data.

In one example, the controller 108 may generate the image capture instruction based also, at least in part, the determined movements of the HMD. For instance, if the HMD is moving radially or axially while a gaze through a gaze point on the field of view provided by the viewfinder 104 has been present for a predetermine duration, the controller 108 may not generate the image capture instruction indicating that an image should be captured. This may be the case when the wearer has located within the field of view of the viewfinder 104 the object of interest the wearer wishes to capture an image of, but may be adjusting the field of view to frame the image to be captured, resulting in the radial or axial movements. In this case, the controller 108 may generate the image capture instruction indicating that an image should be captured after a gaze through a gaze point on the field of view provided by the viewfinder 104 has been present for a predetermine duration, and the movement data indicates the HMD is not moving.

In some cases, small movements of the HMD may be inevitable, even after the wearer has already framed the image to be captured. For instance, small movements may occur when the wearer is breathing, if there is a wind blowing against the wearer, or other natural circumstances. In these cases, the controller 108 may be configured to generate image capture instructions indicating that an image should be captured if the determined movements of the HMD are within a predetermined threshold range. The predetermined threshold range may define a range of motion within which the determined movements of the HMD are considered unintentional or inevitable based on natural circumstances.

In one example, the controller 108 may generate the image capture instruction based also, at least in part, on a movement pattern in the determined movements of the HMD. In the case of HMD 100 as shown in FIGS. 1A and 1B, the viewfinder 104 is positioned above the natural line of sight of the wearer at an angle α. In this case, for the wearer to view an object of interest through the viewfinder 104, after initially seeing the object of interest through the natural line of sight of the wearer, the wearer may tilt the HMD forward by an angle of approximately 90-α degrees. As such, if the determined movements of the HMD include a movement pattern representing a forward tilt by an angle of approximately 90-α degrees, shortly before a determined gaze through the viewfinder, the controller 108 may generate image capture instructions that an image should be captured.

The data storage medium 114 of the HMD 100 may be configured to store at least image data. As such, the data storage medium 114 may be configured to store an image captured by the image capturing device 112 as image data. In one example, the captured image may be automatically stored on the data storage medium 114 once the image is captured by the image capturing device 112. In the case that the image capturing device 112 is also configured to capture video, the data storage medium 114 may also be configured to store video captured by the image capturing device 112 as video data.

In another example, the captured image may be stored on the data storage medium 114 based on an image storage instruction. As mentioned above, the HMD 100 may further include a display, similar to a display 508 of FIG. 5A. In this case, the controller 108 may be configured to cause a preview of the captured image to be provided on the display, for the wearer to view. The controller 108 may further be configured to prompt the wearer to provide an image storage input indicating whether to store the captured image in the data storage medium 114. As such, the wearer may view the captured image and determine upon viewing the captured image whether the captured image is to be stored. The controller 108 may be configured to then determine image storage instructions based on the image storage input provided by the wearer, and cause the captured image to be stored on the data storage medium 114 based on the image storage instructions.

The image storage input may be received from the wearer through different means. In one example, the image storage input may be received as a pattern of movements detectable by the motion detection system 110. In another example, the image storage input may be received from the wearer via the finger-operable touch pad 116. The finger-operable touch pad 116 may be configured to detect finger movements of the wearer, indicating image storage preferences of the wearer. The finger-operable touch pad 116 may be similar to a finger-operable touch pad 424 of FIG. 4A. Further detail pertaining to the finger-operable touch pad 424 can be found below in connection to FIG. 4A.

In one example, the controller 108 may be configured to prompt the wearer to further indicate a file format in which the captured image is to be stored. In one case, the wearer may be prompted to indicate the file format after indicating that the captured image should be stored. After receiving an indication of the file format from the wearer, the controller 108 may be configured to determine the image storage instructions based also on the indicated file format, and cause the captured image to be stored on the data storage medium 114 based on the image storage instructions indicating the file format in which to store the captured image.

In the case mentioned above, in which the image capturing device 112 captures video automatically when an image is captured, the captured video may be stored on the data storage medium 114 based also on the image storage instruction. In one example, the image storage instructions may indicate whether the captured video should be stored based on a fourth predetermined duration of the gaze through the viewfinder 104 after the image capture was triggered. For example, if the wearer did not maintain a gaze through the viewfinder 104 for at least three seconds after the image capture was triggered, the image storage instruction may indicate that the captured video should be discarded. On the other hand, if the gaze through the viewfinder 104 was maintained for longer than three seconds, the image storage instruction may indicate that the captured video should be stored on the data storage medium 114.

In a further embodiment, the HMD 100 may further include a global positioning system (GPS). In one example, the GPS may be configured to determine a geographic location associated with the HMD. In this case, the controller 108 may be configured to acquire the geographic location associated with the HMD from the GPS when an image is captured, and accordingly associate the acquired geographic location with the captured image. In this instance, the associated geographic location may also be stored on the data storage medium 114 when storing the captured image.

3. Example Method for Capturing of Images by a HMD

While examples described herein may refer specifically to the use of the HMD 100, those skilled in the art will appreciate that any wearable computing device with a camera may be configured to execute the methods described herein to achieve relevant results.

Figure 2B:
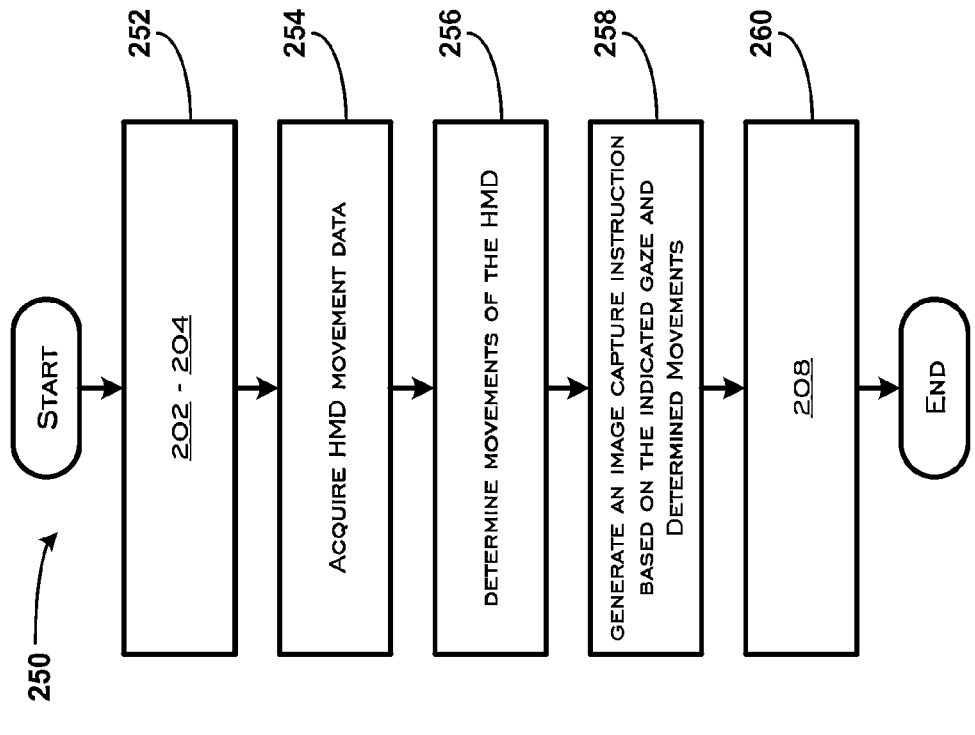
FIG. 2B is a block diagram an alternative exemplary method for capturing images based on gaze detection.
Figure 2A:
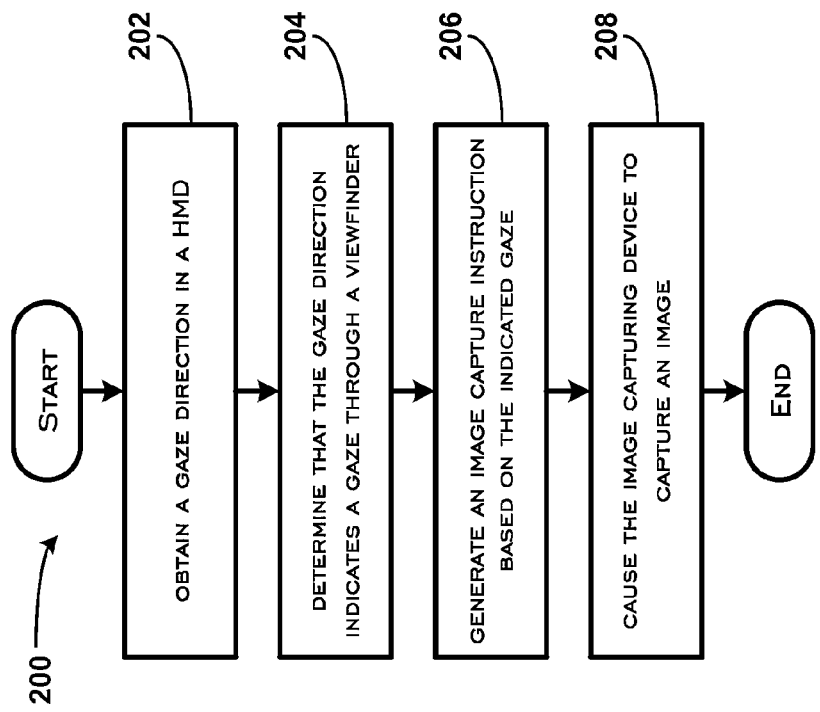
FIG. 2A is a block diagram of an exemplary method for capturing images based on gaze detection.

FIG. 2A is a block diagram of an exemplary method 200 for capturing images based on gaze detection. While examples described herein may refer specifically to the use of the HMD 100, those skilled in the art will appreciate that any wearable computing device with a camera may be configured to execute the methods described herein to achieve the desired results. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive, as described later in FIGS. 6 and 7. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 202, the method 200 involves obtaining a gaze direction in a HMD. As mentioned above, the HMD may be the HMD 100 discussed in connection to FIGS. 1A and 1B. In this case, a gaze acquisition system may be configured may be to determine a gaze direction in the HMD. Similar to the gaze acquisition system 106, the gaze acquisition system may be configured to acquire the gaze direction based on eye-tracking data provided by an eye-tracking device coupled to the gaze acquisition system. The eye-tracking device may be configured to determine gaze points based on eye movements of the wearer of the HMD, and as discussed previously in connection to the controller 108 of FIGS. 1A and 1B, the gaze direction of a wearer of the HMD may be determined based on gaze points.

At block 204, the method 200 involves determining that the gaze direction indicates a gaze through a viewfinder providing a field of view, similar to the viewfinder 104 of FIGS. 1A and 1B. As discussed previously in connection to the controller 108 of FIGS. 1A and 1B, relative positions between an eye of the wearer and the viewfinder may be based on to determine if the gaze direction of the wearer is through field of view provided by the viewfinder.

At block 206, the method 200 involves generating an image capture instruction based on the indicated gaze through the view finder. As discussed previously in connection to the controller 108 of FIGS. 1A and 1B, if the gaze direction of the wearer is determined to be through the field of view provided by the viewfinder, the image capture instruction may be generated indicating that an image capturing device, such as the image capturing device 112 of FIGS. 1A and 1B is to capture an image.

At block 208, the method 200 involves causing the image capturing device to capture an image in accordance with the image capture instruction. As discussed previously in connection with the controller 108 of FIGS. 1A and 1B, the generated image capture instruction may be provided to the image capturing device instructing the image capturing device to capture an image. Similar to the image capturing device 112 of FIGS. 1A and 1B, the image capturing device may be configured such that an imaging field of view of the image capturing device includes the field of view provided by the viewfinder. Accordingly, an image captured by the image capturing device includes the field of view provided by the viewfinder.

FIG. 2B is a block diagram an alternative exemplary method 250 for capturing images based on gaze detection. Method 250 may include one or more operations, functions, or actions as illustrated by one or more of blocks 252-260. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

At block 252, the method 250 includes blocks 202 and 204 of method 200 of FIG. 2A. As such, the gaze direction of the wearer of the HMD has been obtained, and further, the gaze through the viewfinder has been determined.

At block 254, the method 250 involves acquiring movement data associated with the HMD. In one example, a motion detection system such as the motion detection system 110 of FIGS. 1A and 1B may be configured to detect movements of the HMD and generating movement data based on the detected movements. In this case, the motion detection system may include accelerometers to detect at least linear, radial, and axial movements. As discussed previously in connection to the controller 108 of FIGS. 1A and 1B, movement data associated with the HMD may be acquired from the motion detection system.

At block 256, the method 250 involves determining movements of the HMD. In one example, movements of the HMD may be determined based on the movement data, and a pattern of movements of the HMD may be further determined, as discussed previously in connection to the controller 108 of FIGS. 1A and 1B. In one case, if the determined movements of the HMD are within a threshold movement range, the HMD may be determined to be physically stable, or effectively non-moving.

At block 258, the method 250 involves generating an image capture instruction based on the indicated gaze and determined movements. As discussed previously in connection to the controller 108 of FIGS. 1A and 1B, a wearer of the HMD may be using the field of view provide by the viewfinder to frame an object of interest the wearer wishes to capture an image of, thereby moving the HMD while looking through the viewfinder. As such, the generated image capture instruction may not indicate that an image is to be captured by the image capturing device unless the HMD is determined to be moving within the predetermined threshold along with determining that gaze through the field of view provided by the viewfinder is present.

Further, in the case that the viewfinder is positioned above the natural line of sight of the wearer at an angle α, as discussed previously, a pattern of movements prior to the determination that a gaze through the field of view is present may be used to determine whether to generate an image capture instruction. For example, a pattern of movement involving a forward tilt of approximately 90-α degrees shortly before to gaze through the viewfinder is determined may be used to indicate that an image capture instruction should be generated.

At block 260, the method 250 includes block 208 of method 200 shown in FIG. 2A. As such, the generated image capture instructions may be provided to the image capturing device instructing the image capturing device to capture an image.

4. Example Use of Image Capturing Head-Mounted Device

Figure 3A:
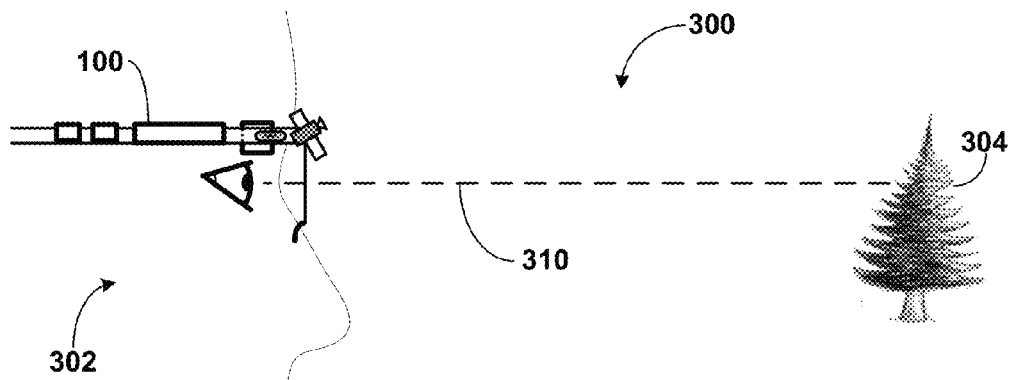
FIG. 3A illustrates a first view of a scenario of an HMD capturing an image based on gaze detection.
Figure 3B:
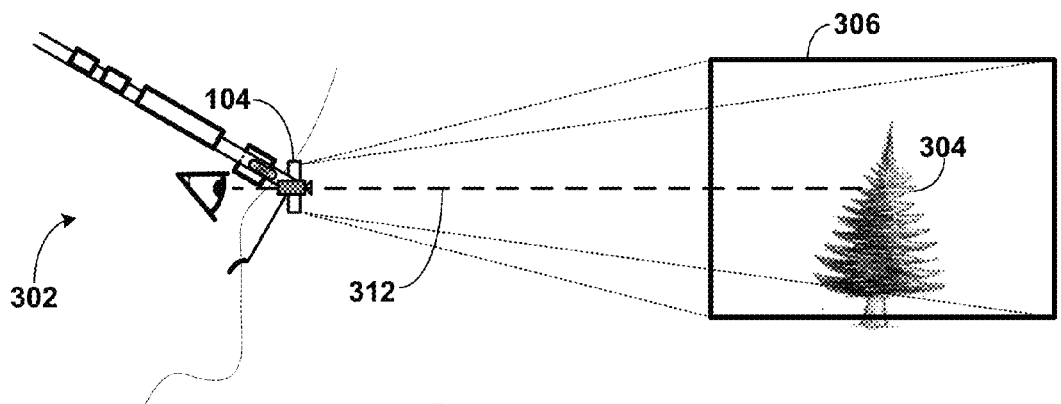
FIG. 3B illustrates a second view of the scenario of an HMD capturing an image based on gaze detection.
Figure 3C:
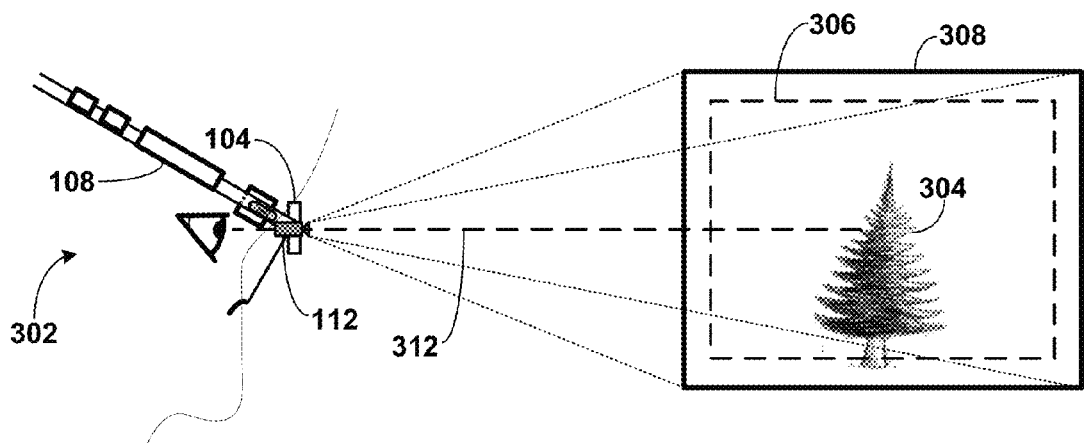
FIG. 3C illustrates a third view of the scenario of an HMD capturing an image based on gaze detection.

FIGS. 3A-3C illustrates different views of an example scenario 300 of a user 302 capturing an image using a HMD. As shown, the HMD worn by the user 302 may be the HMD 100 described above in connection to FIGS. 1A and 1B. In another case, the HMD worn by the user 302 may be configured to execute the methods 200 and 250 described above in connection to FIGS. 2A and 2B. Note that the views of the scenario discussed herein are for purposes of illustration only and do not represent a preferred mode of utility of the HMD.

FIG. 3A illustrates a first view of the scenario 300 of a HMD capturing an image based on gaze detection. As shown, the user 302 wearing the HMD 100 is looking at an object of interest 304 along a first line of sight 310. In this case, the first line of sight 310 may be the natural line of sight of the user 302. After looking at the object of interest 304, the user 302 may decide to capture an image of the object of interest 304.

FIG. 3B illustrates a second view of the scenario 300 of a HMD capturing an image based on gaze detection. After deciding to capture an image of the object of interest 304, the user 302 wearing the HMD 100 may tilt the HMD 100 forward such that the user 302 is looking at the object of interest 304 along a second line of sight 312, through the viewfinder 104. In the case that the viewfinder 104 of the HDM 100 is positioned at an angle α above the natural line of sight of the user 302, the user 302 may tilt the HMD 100 forward at an angle of approximately 90-α degrees to look at the object of interest 304 through the viewfinder 104. As shown, a field of view 306 provided by the viewfinder 104 includes the object of interest 304 the user 302 is looking at and wishes to capture an image of.

FIG. 3C illustrates a third view of the scenario 300 of a HMD capturing an image based on gaze detection. Once the user 302 has located the object of interest 304 within the field of view 306 provided by the viewfinder 104, the controller 108 may generate image capture instructions instructing the image capturing device 112 to capture an image. As shown, an imaging field of view 308 of the image capturing device 112 includes the field of view 306 provided by the viewfinder 104, such that the image captured by the image capturing device 112 will include what the user 302 sees within the field of view 306, while looking through the viewfinder 104.

5. Example System and Device Architecture

In addition to the example systems discussed above in connection to FIGS. 1A and 1B, other systems may be configured to execute the methods discussed in connection to FIGS. 2A and 2B, such that a user may capture an image in a similar manner to what is shown in FIGS. 3A-C.

FIG. 4A illustrates an example system 400 for receiving, transmitting, and displaying data. The system 400 is shown in the form of a wearable computing device. While FIG. 4A illustrates a head-mounted device 402 as an example of a wearable computing device, other types of wearable computing devices could additionally or alternatively be used. As illustrated in FIG. 4A, the head-mounted device 402 has frame elements including lens-frames 404, 406 and a center frame support 408, lens elements 410, 412, and extending side-arms 414, 416. The center frame support 408 and the extending side-arms 414, 416 are configured to secure the head-mounted device 402 to a user's face via a user's nose and ears, respectively.

Each of the frame elements 404, 406, and 408 and the extending side-arms 414, 416 may be formed of a solid structure of plastic and/or metal, or may be formed of a hollow structure of similar material so as to allow wiring and component interconnects to be internally routed through the head-mounted device 402. Other materials may be possible as well.

One or more of each of the lens elements 410, 412 may be formed of any material that can suitably display a projected image or graphic. Each of the lens elements 410, 412 may also be sufficiently transparent to allow a user to see through the lens element. Combining these two features of the lens elements may facilitate an augmented reality or heads-up display where the projected image or graphic is superimposed over a real-world view as perceived by the user through the lens elements 410, 412.

The extending side-arms 414, 416 may each be projections that extend away from the lens-frames 404, 406, respectively, and may be positioned behind a user's ears to secure the head-mounted device 402 to the user. The extending side-arms 414, 416 may further secure the head-mounted device 402 to the user by extending around a rear portion of the user's head. Additionally or alternatively, for example, the system 400 may connect to or be affixed within a head-mounted helmet structure. Other possibilities exist as well.

The system 400 may also include an on-board computing system 418, a video camera 420, a sensor 422, and a finger-operable touch pad 424. The on-board computing system 418 is shown to be positioned on the extending side-arm 414 of the head-mounted device 402; however, the on-board computing system 418 may be provided on other parts of the head-mounted device 402 or may be positioned remote from the head-mounted device 402 (e.g., the on-board computing system 418 could be connected by wires or wirelessly connected to the head-mounted device 402). The on-board computing system 418 may include a processor and memory, for example. The on-board computing system 418 may be configured to receive and analyze data from the video camera 420, the sensor 422, and the finger-operable touch pad 424 (and possibly from other sensory devices, user-interfaces, or both) and generate images for output by the lens elements 410 and 412. The on-board computing system 418 may additionally include a speaker or a microphone for user input (not shown). An example computing system is further described below in connection with FIG. 7.

The video camera 420 is shown positioned on the extending side-arm 414 of the head-mounted device 402; however, the video camera 420 may be provided on other parts of the head-mounted device 402. The video camera 420 may be configured to capture images at various resolutions or at different frame rates. Video cameras with a small form-factor, such as those used in cell phones or webcams, for example, may be incorporated into an example embodiment of the system 400.

Further, although FIG. 4A illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown on the extending side-arm 416 of the head-mounted device 402; however, the sensor 422 may be positioned on other parts of the head-mounted device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mounted device 402. However, the finger-operable touch pad 424 may be positioned on other parts of the head-mounted device 402. Also, more than one finger-operable touch pad may be present on the head-mounted device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present, each finger-operable touch pad may be operated independently, and may provide a different function.

Figure 4B:
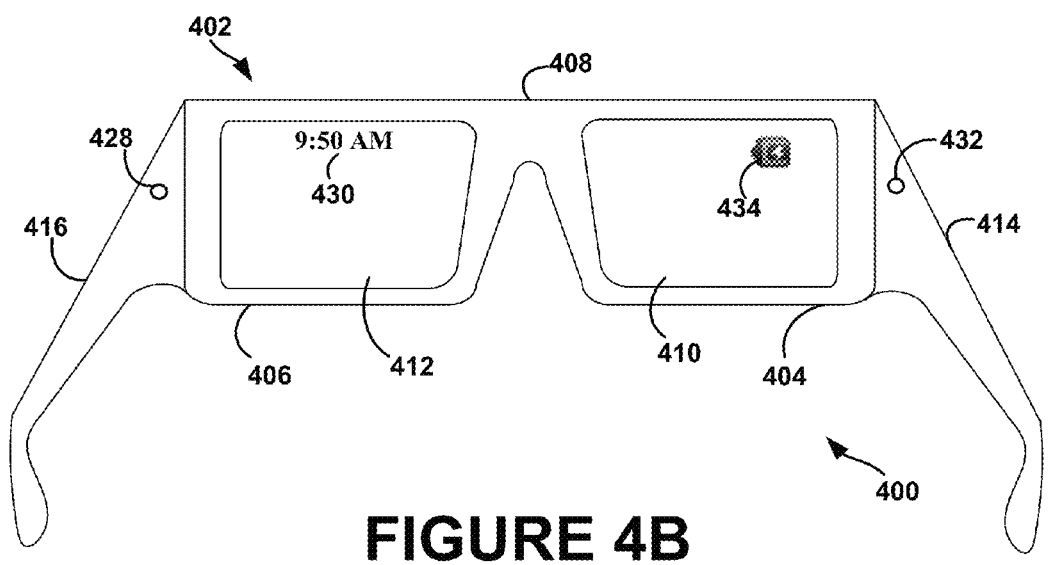
FIG. 4B illustrates an alternate view of the system illustrated in FIG. 5A.

FIG. 4B illustrates an alternate view of the system 400 illustrated in FIG. 4A. As shown in FIG. 4B, the lens elements 410, 412 may act as display elements. The head-mounted device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The lens elements 410, 412 may act as a combiner in a light projection system and may include a coating that reflects the light projected onto them from the projectors 428, 432. In some embodiments, a reflective coating may be omitted (e.g., when the projectors 428, 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404, 406 for driving such a matrix display. Alternatively or additionally, a laser or light emitting diode (LED) source and scanning system could be used to draw a raster display directly onto the retina of one or more of the user's eyes. Other possibilities exist as well.

FIG. 5A illustrates an example system 500 for receiving, transmitting, and displaying data. The system 500 is shown in the form of a wearable computing device 502, which may be implemented as the HMD discussed above, for data item searching. The wearable computing device 502 may include frame elements and side-arms such as those described with respect to FIGS. 4A and 4B. The wearable computing device 502 may additionally include an on-board computing system 504 and a video camera 506, such as those described with respect to FIGS. 4A and 4B. The video camera 506 is shown mounted on a frame of the wearable computing device 502; however, the video camera 506 may be mounted at other positions as well.

As shown in FIG. 5A, the wearable computing device 502 may include a single display 508 which may be coupled to the device. The display 508 may be formed on one of the lens elements of the wearable computing device 502, such as a lens element described with respect to FIGS. 4A and 4B, and may be configured to overlay computer-generated graphics in the user's view of the physical world. The display 508 is shown to be provided in a center of a lens of the wearable computing device 502, however, the display 508 may be provided in other positions. The display 508 is controllable via the computing system 504 that is coupled to the display 508 via an optical waveguide 510.

FIG. 5B illustrates an example system 520 for receiving, transmitting, and displaying data. The system 520 is shown in the form of a wearable computing device 522. The wearable computing device 522 may include side-arms 523, a center frame support 524, and a bridge portion with nosepiece 525. In the example shown in FIG. 5B, the center frame support 524 connects the side-arms 523. The wearable computing device 522 does not include lens-frames containing lens elements. The wearable computing device 522 may additionally include an on-board computing system 526 and a video camera 528, such as those described with respect to FIGS. 4A and 4B.

The wearable computing device 522 may include a single lens element 530 that may be coupled to one of the side-arms 523 or the center frame support 524. The lens element 530 may include a display such as the display described with reference to FIGS. 4A and 4B, and may be configured to overlay computer-generated graphics upon the user's view of the physical world. In one example, the single lens element 530 may be coupled to a side of the extending side-arm 523. The single lens element 530 may be positioned in front of or proximate to a user's eye when the wearable computing device 522 is worn by a user. For example, the single lens element 530 may be positioned below the center frame support 524, as shown in FIG. 5B.

FIG. 6 shows a simplified block diagram of an example computer network infrastructure. In system 600, a device 610 communicates using a communication link 620 (e.g., a wired or wireless connection) to a remote device 630. The device 610 may be any type of device that can receive data and display information corresponding to or associated with the data. For example, the device 610 may be a heads-up display system, such as the head-mounted device 402, 500, or 520 described with reference to FIGS. 4A-5B.

Thus, the device 610 may include a display system 612 including a processor 614 and a display 616. The display 616 may be, for example, an optical see-through display, an optical see-around display, or a video see-through display. The processor 614 may receive data from the remote device 630, and configure the data for display on the display 616. The processor 614 may be any type of processor, such as a microprocessor or a digital signal processor, for example.

The device 610 may further include on-board data storage, such as memory 618 coupled to the processor 614. The memory 618 may store software that can be accessed and executed by the processor 614, for example.

The remote device 630 may be any type of computing device or transmitter including a laptop computer, a mobile telephone, or tablet computing device, etc., that is configured to transmit data to the device 610. The remote device 630 and the device 610 may contain hardware to enable the communication link 620, such as processors, transmitters, receivers, antennas, etc.

In FIG. 6, the communication link 620 is illustrated as a wireless connection; however, wired connections may also be used. For example, the communication link 620 may be a wired serial bus such as a universal serial bus or a parallel bus, among other connections. The communication link 620 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 630 may be accessible via the Internet and may include a computing cluster associated with a particular web service (e.g., social-networking, photo sharing, address book, etc.).

Figure 7:
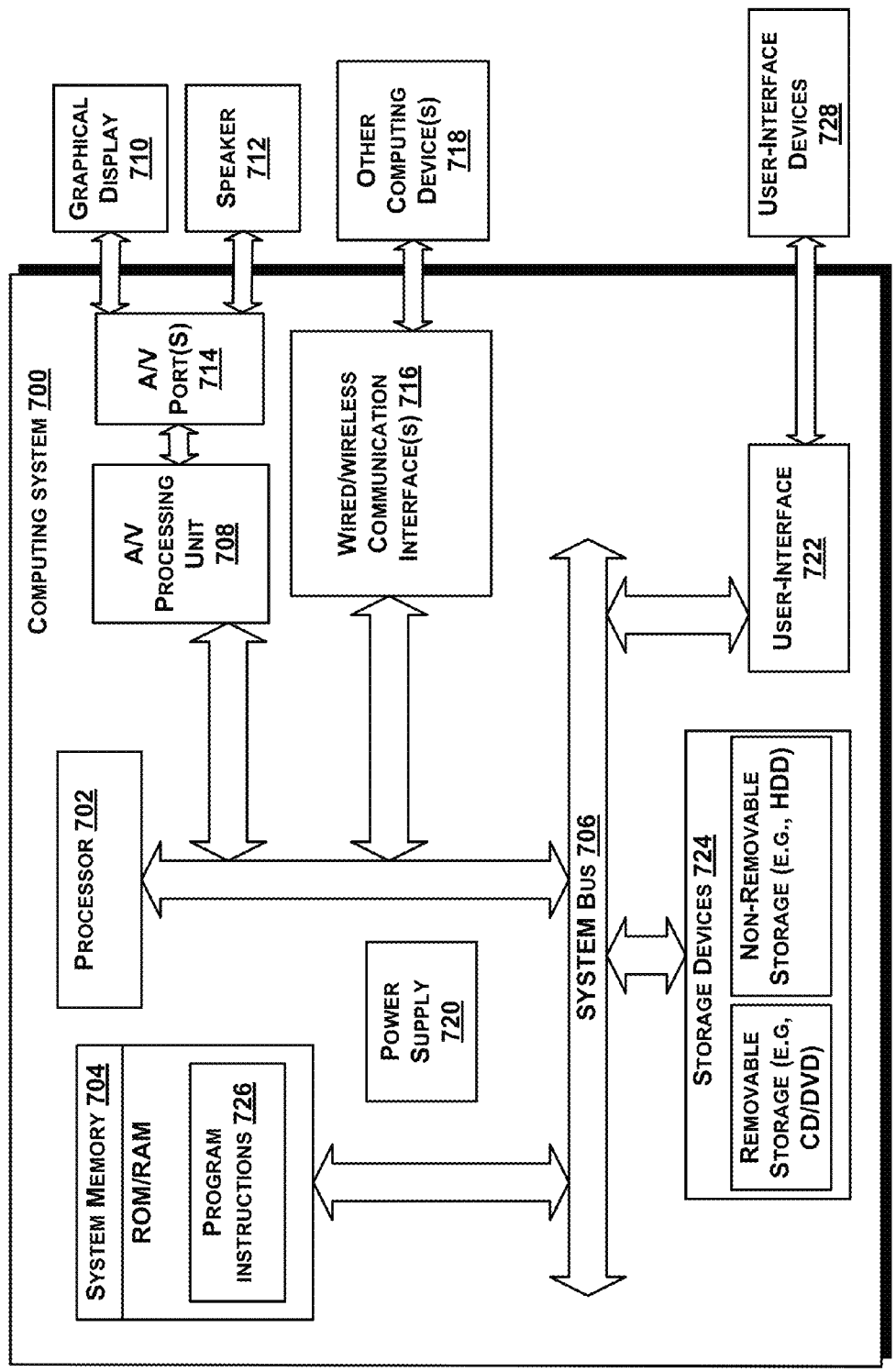
FIG. 7 shows a simplified block diagram depicting example components of an example computing system.

As described above in connection with FIGS. 4A-5B, an example wearable computing device may include, or may otherwise be communicatively coupled to, a computing system, such as computing system 418 or computing system 504. FIG. 7 shows a simplified block diagram depicting example components of an example computing system 600. One or both of the device 610 and the remote device 630 may take the form of computing system 700.

Computing system 700 may include at least one processor 702 and system memory 704. In an example embodiment, computing system 700 may include a system bus 706 that communicatively connects processor 702 and system memory 704, as well as other components of computing system 700. Depending on the desired configuration, processor 702 can be any type of processor including, but not limited to, a microprocessor (μP), a microcontroller (μC), a digital signal processor (DSP), or any combination thereof. Furthermore, system memory 704 can be of any type of memory now known or later developed including but not limited to volatile memory (such as RAM), non-volatile memory (such as ROM, flash memory, etc.) or any combination thereof.

An example computing system 700 may include various other components as well. For example, computing system 700 includes an A/V processing unit 708 for controlling graphical display 710 and speaker 712 (via A/V port 714), one or more communication interfaces 716 for connecting to other computing devices 718, and a power supply 720. Graphical display 710 may be arranged to provide a visual depiction of various input regions provided by user-interface module 722. For example, user-interface module 722 may be configured to provide a user-interface, such as the example user-interface described below in connection with FIGS. 8A-D, and graphical display 710 may be configured to provide a visual depiction of the user-interface. User-interface module 722 may be further configured to receive data from and transmit data to (or be otherwise compatible with) one or more user-interface devices 728.

Furthermore, computing system 700 may also include one or more data storage devices 724, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 700.

According to an example embodiment, computing system 700 may include program instructions 726 that are stored in system memory 704 (and/or possibly in another data-storage medium) and executable by processor 702 to facilitate the various functions described herein including, but not limited to, those functions described with respect to FIGS. 2A-B. Although various components of computing system 700 are shown as distributed components, it should be understood that any of such components may be physically integrated and/or distributed according to the desired configuration of the computing system.

6. Example Device User-Interface

FIGS. 8A-D show aspects of an example user-interface 800. The user-interface 800 may be displayed by, for example, a wearable computing device as described above for FIGS. 4A-5B.

Figure 8A:
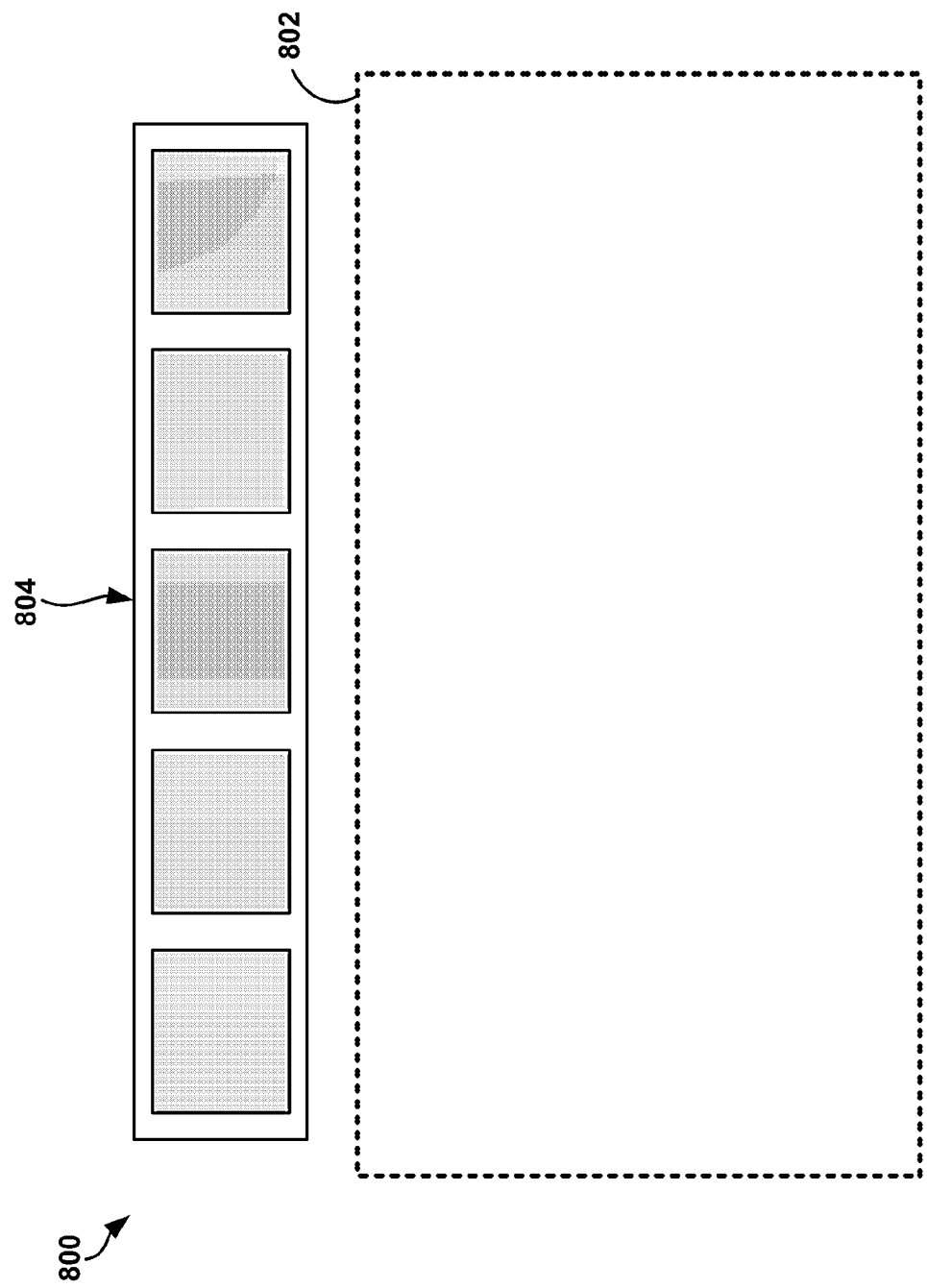
FIG. 8A shows aspects of an example user-interface.

An example state of the user-interface 800 is shown in FIG. 8A. The example state shown in FIG. 8A may correspond to a first position of the wearable computing device. That is, the user-interface 800 may be displayed as shown in FIG. 8A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 800 includes a view region 802. An example boundary of the view region 802 is shown by a dotted frame. While the view region 802 is shown to have a landscape shape (in which the view region 802 is wider than it is tall), in other embodiments the view region 802 may have a portrait or square shape, or may have a non-rectangular shape, such as a circular or elliptical shape. The view region 802 may have other shapes as well.

The view region 802 may be, for example, the viewable area between (or encompassing) the upper, lower, left, and right boundaries of a display on the wearable computing device. As shown, when the wearable computing device is in the first position, the view region 802 is substantially empty (e.g., completely empty) of user-interface elements, such that the user's view of their real-world environment is generally uncluttered, and objects in the user's environment are not obscured.

In some embodiments, the view region 802 may correspond to a field of view of a wearer of the wearable computing device, and an area outside the view region 802 may correspond to an area outside the field of view of the wearer. In other embodiments, the view region 802 may correspond to a non-peripheral portion of a field of view of a wearer of the wearable computing device, and an area outside the view region 802 may correspond to a peripheral portion of the field of view of the wearer. In still other embodiments, the user-interface 800 may be larger than or substantially the same size as a field of view of a wearer of the wearable computing device, and the field of view of the wearer may be larger than or substantially the same size as the view region 802. The view region 802 may take other forms as well.

Accordingly, the portions of the user-interface 800 outside of the view region 802 may be outside of or in a peripheral portion of a field of view of a wearer of the wearable computing device. For example, as shown, a menu 804 may be outside of or in a peripheral portion of the field of view of the user in the user-interface 800. While the menu 804 is shown to be not visible in the view region 802, in some embodiments the menu 804 may be partially visible in the view region 802.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 802 and the menu 804 to move such that the menu 804 becomes more visible in the view region 802. For example, the wearable computing device may cause the view region 802 to move upward and may cause the menu 804 to move downward. The view region 802 and the menu 804 may move the same amount, or may move different amounts. In one embodiment, the menu 804 may move further than the view region 802. As another example, the wearable computing device may cause only the menu 804 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 422 described above in connection with FIG. 4A. In some embodiments, the movement data may include a binary indication corresponding to the upward movement. In other embodiments, the movement data may include an indication corresponding to the upward movement as well as an extent of the upward movement. The movement data may take other forms as well.

Figure 8B:
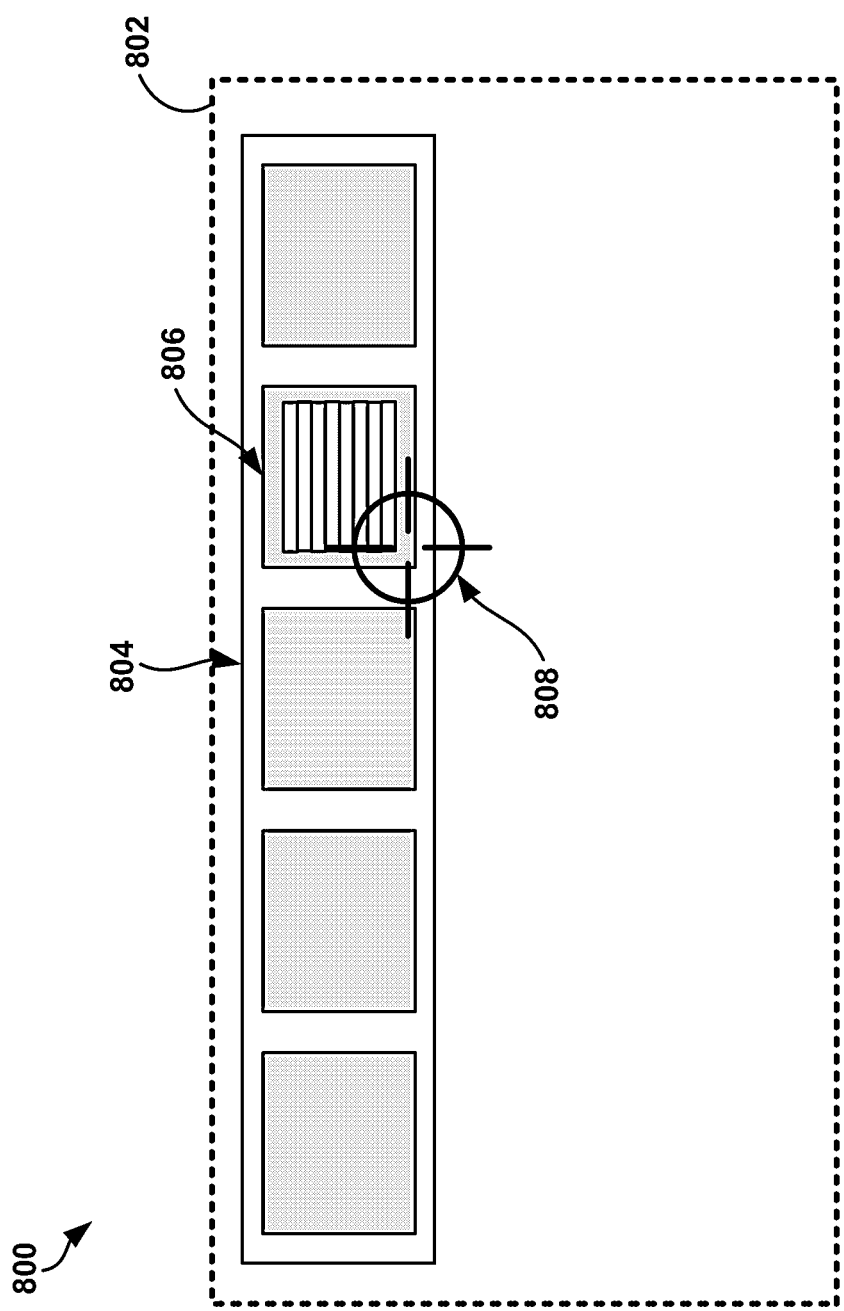
FIG. 8B shows aspects of an example user-interface after receiving movement data corresponding to an upward movement.

FIG. 8B shows aspects of an example user-interface after receiving movement data corresponding to an upward movement. As shown, the user-interface 800 includes the view region 802 and the menu 804.

As noted above, in response to receiving the movement data corresponding to an upward movement of the wearable computing device, the wearable computing device may move one or both of the view region 802 and the menu 804 such that the menu 804 becomes more visible in the view region 802.

As shown, the menu 804 is fully visible in the view region 802. In other embodiments, however, only a portion of the menu 804 may be visible in the view region 802. In some embodiments, the extent to which the menu 804 is visible in the view region 802 may be based at least in part on an extent of the upward movement.

Thus, the view region 802 may be moved in response to receiving data corresponding to an upward movement. In some embodiments, the view region 802 may be moved in an upward scrolling or panning motion. For instance, the view region 802 may appear to a wearer of the wearable computing device as if mapped onto the inside of a static sphere centered at the wearable computing device, and movement of the view region 802 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 802 may be moved by, for example, jumping between fields of view. In still other embodiments, the view region 802 may be moved only when the upward movement exceeds a threshold speed, acceleration, and/or magnitude. In response to receiving data corresponding to an upward movement that exceeds such a threshold or thresholds, the view region 802 may pan, scroll, slide, or jump to a new field of view. The view region 802 may be moved in other manners as well.

While the foregoing description focused on upward movement, it is to be understood that the wearable computing device could be configured to receive data corresponding to other directional movement (e.g., downward, leftward, rightward, etc.) as well, and that the view region 802 may be moved in response to receiving such data in a manner similar to that described above in connection with upward movement.

As shown, the menu 804 includes a number of content objects 806. In some embodiments, the content objects 806 may be arranged in a ring (or partial ring) around and above the head of a wearer of the wearable computing device. In other embodiments, the content objects 806 may be arranged in a dome-shape above the wearer's head. The ring or dome may be centered above the wearable computing device and/or the wearer's head. In other embodiments, the content objects 806 may be arranged in other ways as well.

The number of content objects 806 in the menu 804 may be fixed or may be variable. In embodiments where the number is variable, the content objects 806 may vary in size according to the number of content objects 806 in the menu 804. In embodiments where the content objects 806 extend circularly around a wearer's head, like a ring (or partial ring), only some of the content objects 806 may be visible at a particular moment. In order to view other content objects 804, a wearer of the wearable computing device may interact with the wearable computing device to, for example, rotate the content objects 806 along a path (e.g., clockwise or counterclockwise) around the wearer's head. To this end, the wearable computing device may be configured to receive data indicating such an interaction through, for example, a touch pad, such as finger-operable touch pad 424. Alternatively or additionally, the wearable computing device may be configured to receive such data through other input devices as well.

Depending on the application of the wearable computing device, the content objects 806 may take several forms. For example, the content objects 806 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 806 may take other forms as well.

In embodiments where the content objects 806 include tools, the tools may be located in a particular region of the menu 804, such as the center. In some embodiments, the tools may remain in the center of the menu 804, even if the other content objects 806 rotate, as described above. Tool content objects may be located in other regions of the menu 804 as well.

The particular content objects 806 that are included in menu 804 may be fixed or variable. For example, the content objects 806 may be preselected by a wearer of the wearable computing device. In another embodiment, the content objects 806 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 806 may fixed, while the content objects 806 may be variable. The content objects 806 may be selected in other manners as well.

Similarly, an order or configuration in which the content objects 806 are displayed may be fixed or variable. In one embodiment, the content objects 806 may be pre-ordered by a wearer of the wearable computing device. In another embodiment, the content objects 806 may be automatically ordered based on, for example, how often each content object 806 is used (on the wearable computing device only or in other contexts as well), how recently each content object 806 was used (on the wearable computing device only or in other contexts as well), an explicit or implicit importance or priority ranking of the content objects 806, and/or other criteria.

In some embodiments, the wearable computing device may be further configured to receive from the wearer a selection of a content object 806 from the menu 804. To this end, the user-interface 800 may include a cursor 808, shown in FIG. 8B as a reticle, which may be used to navigate to and select content objects 806 from the menu 804. In some embodiments, the cursor 808 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 422, or may be included in a peripheral device communicatively coupled to the wearable computing device. As another example, the selection data may be (or may be derived from) data received from a touch pad, such as the finger-operable touch pad 424 described above in connection with FIG. 4A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 808 to the content object 806 using one or more predetermined movements. In order to select the content object 806, the wearer may perform an additional predetermined movement, such as holding the cursor 808 over the content object 806 for a predetermined period of time. The wearer may select the content object 806 in other manners as well.

Once a content object 806 is selected, the wearable computing device may cause the content object 806 to be displayed in the view region 802 as a selected content object.

Figure 8C:
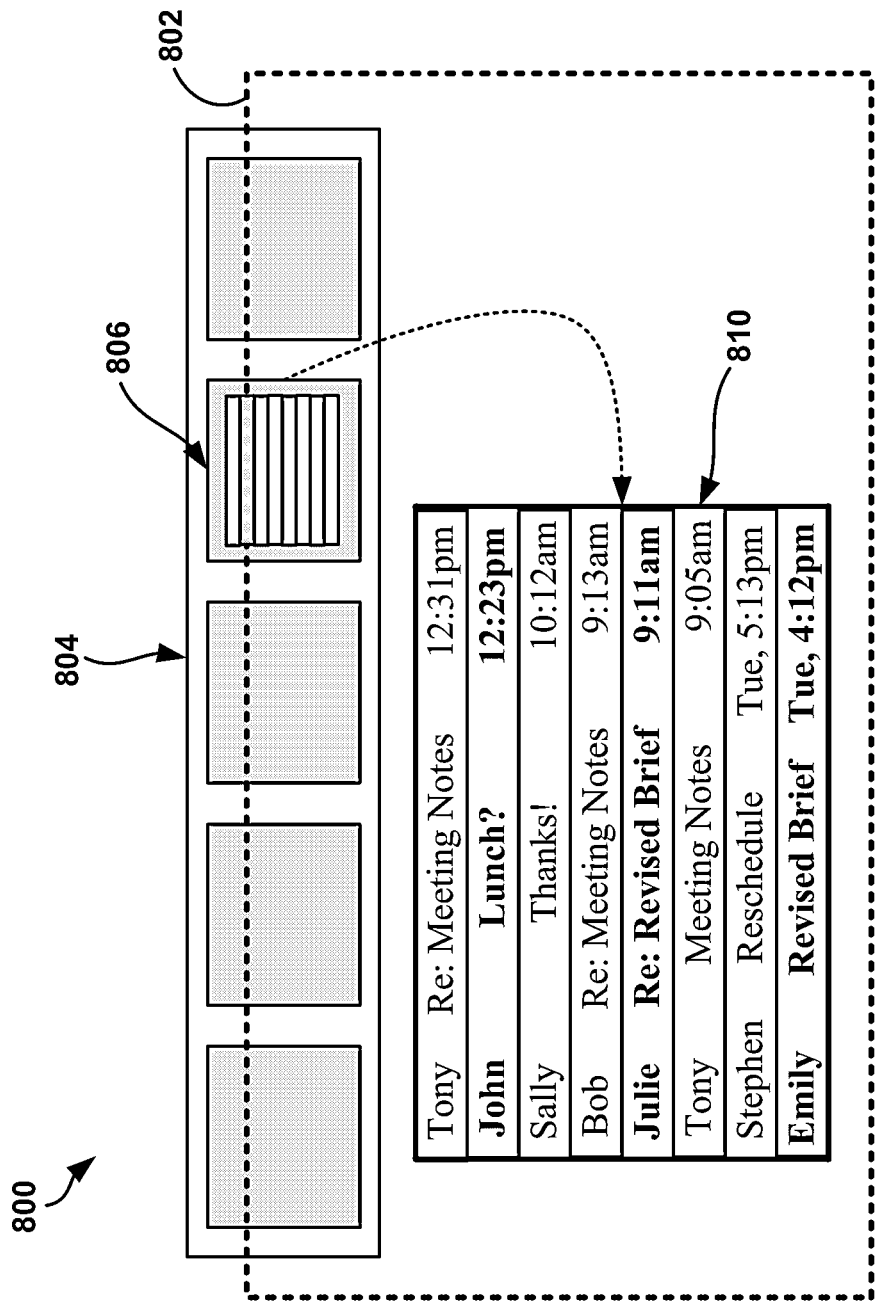
FIG. 8C shows aspects of an example user-interface after selection of a selected content object.

FIG. 8C shows aspects of an example user-interface after selection of a selected content object, in accordance with an embodiment.

As indicated by the dotted arrow, the content object 806 is displayed in the view region 802 as a selected content object 810. As shown, the selected content object 810 is displayed larger and in more detail in the view region 802 than in the menu 804. In other embodiments, however, the selected content object 810 could be displayed in the view region 802 smaller than or the same size as, and in less detail than or the same detail as, the menu 804. In some embodiments, additional content (e.g., actions to be applied to, with, or based on the selected content object 810, information related to the selected content object 810, and/or modifiable options, preferences, or parameters for the selected content object 810, etc.) may be showed adjacent to or nearby the selected content object 810 in the view region 802.

Once the selected content object 810 is displayed in the view region 802, a wearer of the wearable computing device may interact with the selected content object 810. For example, as the selected content object 810 is shown as an email inbox, the wearer may wish to read one of the emails in the email inbox. Depending on the selected content object, the wearer may interact with the selected content object in other ways as well (e.g., the wearer may locate additional information related to the selected content object 810, modify, augment, and/or delete the selected content object 810, etc.). To this end, the wearable computing device may be further configured to receive input data corresponding to one or more predetermined movements indicating interactions with the user-interface 800. The input data may take any of the forms described above in connection with the selection data.

Figure 8D:
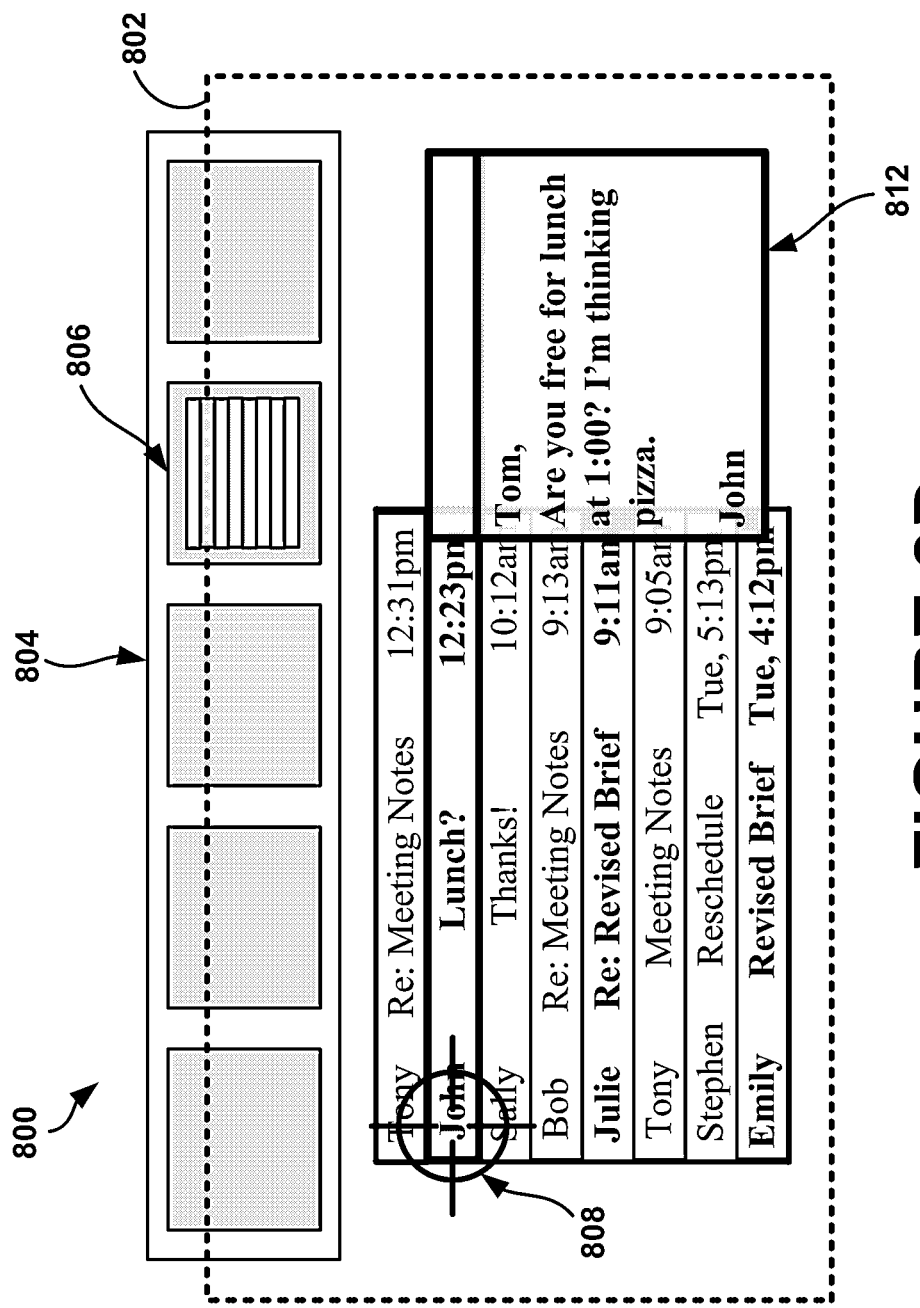
FIG. 8D shows aspects of an example user-interface after receiving input data corresponding to a user input.

FIG. 8D shows aspects of an example user-interface after receiving input data corresponding to a user input, in accordance with an embodiment. As shown, a wearer of the wearable computing device has navigated the cursor 808 to a particular subject line in the email inbox and selected the subject line. As a result, the email 812 is displayed in the view region, so that the wearer may read the email 812. The wearer may interact with the user-interface 800 in other manners as well, depending on, for example, the selected content object.

As mentioned previously, the HMD 402 of FIGS. 4A and 4B, and the system 500 of FIGS. 5A and 5B may be configured to include a viewfinder similar to the viewfinder 104 discussed in connection to FIGS. 1A and 1B for the purpose of capturing images. Accordingly, the system 600 of FIG. 6 and computing system 700 of FIG. 7 may be implemented to execute the functions discussed in connection to FIGS. 2A and 2B for capturing an image. In addition, the user-interface 800 of FIGS. 8A-8D may be configured to incorporate displaying a captured image to a user, and further prompting the user for input indicating whether the captured image should be stored.

7. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. An apparatus comprising:
   a viewfinder providing a field of view;
   an image capturing device;
   a gaze acquisition system configured to acquire a gaze direction;
   a motion detection system configured to acquire movement data associated with the apparatus and determine movements of the apparatus based on the movement data; and
   a controller configured to: (1) determine whether the acquired gaze direction indicates a gaze through the viewfinder; (2) generate an image capture instruction based, at least in part, on a determination that the acquired gaze direction indicates a gaze through the viewfinder and on a movement pattern in the determined movements of the apparatus, wherein the movement pattern comprises the apparatus tilting forward, wherein the image capture instruction indicates that the image capturing device should capture an image, and (3) cause the image capturing device to capture an image in accordance with the image capture instruction, wherein the captured image includes at least a portion of the field of view provided by the viewfinder.

2. The apparatus of claim 1, wherein the gaze acquisition system is configured to acquire the gaze direction based on eye-tracking data provided by an eye-tracking device coupled to the gaze acquisition system.

3. The apparatus of claim 1, wherein the controller is configured to determine a gaze point associated with the gaze through the viewfinder, the gaze point indicating a point of interest.

4. The apparatus of claim 3, wherein the controller is configured to generate the image capture instruction so as to cause the image capturing device to focus on the point of interest when capturing the image.

5. The apparatus of claim 1, wherein the controller is configured to generate the image capture instruction based on a duration of the gaze through the viewfinder.

6. The apparatus of claim 5, wherein the controller is further configured to cause the image capturing device to capture a video in accordance with the image capture instruction when the duration of the gaze through the viewfinder exceeds a threshold duration.

7. The apparatus of claim 1, wherein the gaze acquisition system is configured to detect eye-blink data, and wherein the controller is further configured to generate image capture instructions based on eye-blink data detected by the gaze acquisition system.

8. The apparatus of claim 1, further comprising a data storage medium configured to store at least image data, wherein the controller is configured to cause the captured image to be stored on the data storage medium.

9. The apparatus of claim 8, wherein the controller is further configured to (1) cause the captured image to be provided on a display, (2) in response to the captured image being provided, determine image storage instructions based on an image storage input, and (3) cause the captured image to be stored on the data storage medium based on the determined image storage instructions.

10. The apparatus of claim 1, further comprising a display, wherein the viewfinder is positioned at a peripheral position relative to the display.

11. The apparatus of claim 10, wherein the viewfinder is positioned above the display.

12. The apparatus of claim 1, wherein the image capturing device has an imaging field of view that is wider than the field of view provided by the viewfinder.

13. The apparatus of claim 1, wherein the viewfinder provides a visual indication of a center of the provided field of view.

14. A method comprising:
obtaining a gaze direction in an apparatus, wherein the apparatus comprises a viewfinder and an image capturing device;
determining that the gaze direction indicates a gaze through the viewfinder, the viewfinder providing a field of view;
obtaining movement data associated with the apparatus;
determining movements of the apparatus based on the movement data;
generating an image capture instruction based, at least in part, on the indicated gaze through the viewfinder and on a movement pattern in the determined movements of the apparatus, wherein the movement pattern comprises the apparatus tilting forward, wherein the image capture instruction indicates that the image capturing device should capture an image; and
causing the image capturing device to capture an image in accordance with the image capture instruction, wherein the captured image includes at least a portion of the field of view provided by the viewfinder.

15. A non-transitory computer-readable medium having stored thereon instructions executable by a computing device to cause the computing device to perform functions comprising:
obtaining a gaze direction in an apparatus, wherein the apparatus comprises a viewfinder and an image capturing device;
determining that the gaze direction indicates a gaze through the viewfinder, the viewfinder providing a field of view;
obtaining movement data associated with the apparatus;
determining movements of the apparatus based on the movement data;
generating an image capture instruction based, at least in part, on the indicated gaze through the viewfinder and on a movement pattern in the determined movements of the apparatus, wherein the movement pattern comprises the apparatus tilting forward, wherein the image capture instruction indicates that the image capturing device should capture an image; and
causing the image capturing device to capture an image in accordance with the image capture instructions, wherein the captured image includes at least a portion of the field of view provided by the viewfinder.

16. The non-transitory computer readable medium of claim 15, wherein the instructions further comprise:
causing the captured image to be displayed on a display;
receiving an image storage input;
determining image storage instructions based on the image storage input; and
causing the captured image to be stored on a data storage medium based on the determined image storage instructions.

17. The non-transitory computer readable medium of claim 15, wherein the instructions further comprise:
causing the image capturing device to capture a video in accordance with the image capture instruction.

18. The non-transitory computer readable medium of claim 15, wherein the instructions further comprise:
determining a gaze point associated with the gaze through the viewfinder, the gaze point indicating a point of interest; and
causing the image capturing device to focus on the point of interest when capturing the image.

19. The method of claim 14, further comprising:
causing the captured image to be displayed on a display;
receiving an image storage input;
determining image storage instructions based on the image storage input; and
causing the captured image to be stored on a data storage medium based on the determined image storage instructions.

20. The method of claim 14, further comprising:
causing the image capturing device to capture a video in accordance with the image capture instruction.

* * * * *